Figure 4:
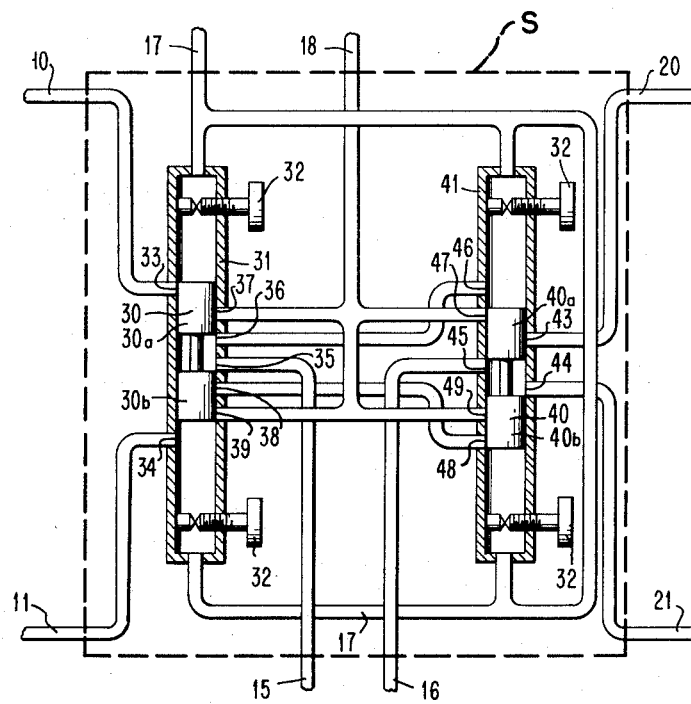

Nov. 28, 1961          H. H. GLATTLI            3,010,649
                        FLUID APPARATUS
Filed May 27, 1959                          4 Sheets-Sheet 1
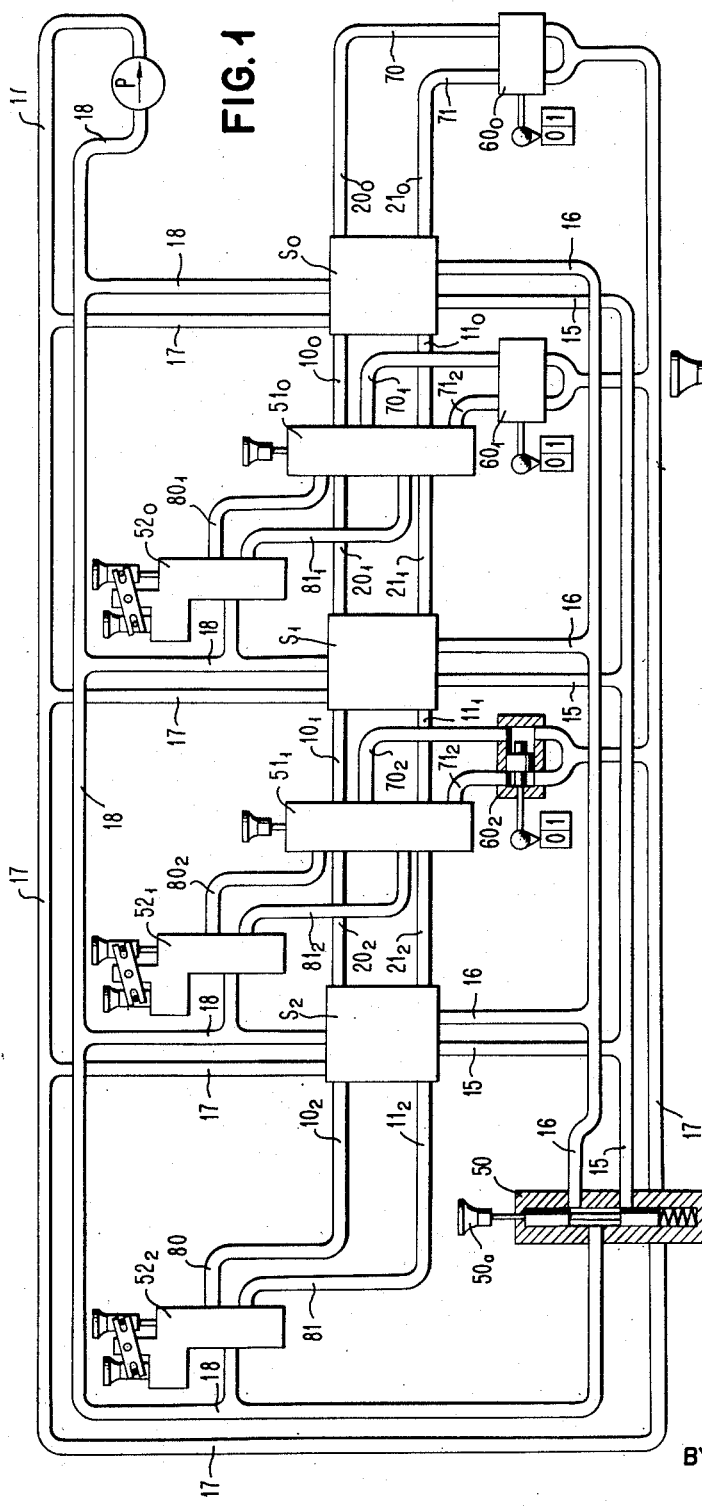
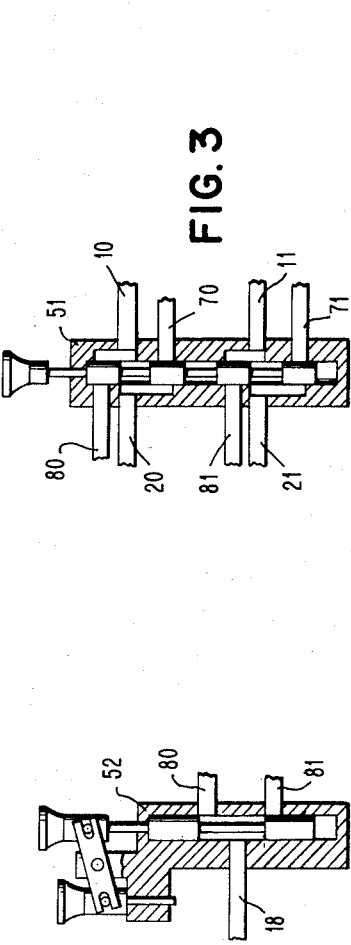
INVENTOR
HANS H. GLÄTTLI
BY *Robert E. Sandt*
AGENT Nov. 28, 1961  H. H. GLATTLI  3,010,649
FLUID APPARATUS
Filed May 27, 1959  4 Sheets-Sheet 4

3,010,649
FLUID APPARATUS
Hans H. Glattli, Kusnacht/ZH, Switzerland, assignor to International Business Machines Corporation, New York, N.Y., a corporation of New York
Filed May 27, 1959, Ser. No. 816,110
9 Claims. (Cl. 235—61)

This invention relates to fluid apparatus and more particularly to fluid valves and their interconnection whereby various logical operations can be performed.

With the advent of digitally controlled machine tools and the use of fluid controlled operations as high speed input and output devices for digital computers, it is a desideratum that certain of the logical operations or arithmetic computations be performed within the fluid apparatus itself so as to obviate an energy conversion from fluid energy to electrical energy for computation and back to fluid energy for utilization. Thus part of the overall machine control, be it a machine tool or a digital computer, can be controlled or sequenced by the operation of the fluid apparatus itself rather than having the fluid mechanism totally subservient to the program control of the master machine.

It is therefore an object of this invention to provide novel fluid valves and interconnections whereby various logical operations can be performed.

A further object is to provide a shift register employing fluid apparatus whereby digital information may be serially entered and serially read out.

Yet another object is to provide a shift register in accordance with the foregoing object in which serially entered digital information may be read out in parallel.

An even further object is to provide a shift register in accordance with the foregoing objects in which digital information may be entered in parallel and read out serially.

Another object is to provide a shift register in accordance with the foregoing objects in which digital information may be entered in parallel and read out in parallel with and without a shift thereof.

Further it is an object to provide novel fluid valves and connections therebetween whereby as between a pair of valves one of the valves in a first control status is conditioned to function as a master valve and the remaining valve conditioned to operate as a slave valve, and in a second control status the second valve is conditioned to function as a slave valve and the first valve as a master valve.

Additionally it is an object to provide an arrangement and interconnection of fluid valves in accordance with the preceding object wherein each valve is so constructed as to be capable of attaining more than two stable states so as to effect logical operations in a radix greater than two.

In furtherance of the preceding object it is an ancillary object to provide a closed loop connection between a pair of valves wherein the output of each is connected to the input of the other, each valve being adapted to function as master valve while the other is adapted to function as a slave valve in alternate succession, and each valve having a number of stable states in excess of two whereby the state of one of the valves manifests the number of successive alternations in master-slave relationship so as to achieve thereby a counter.

Finally a specific object of this invention is to provide a valve structure wherein a plurality of similar valves may be connected in a chain with common control connections to each of the valves whereby in one status of the common control connections the even valves in the chain are adapted to operate as master valves and the odd valves are adapted to operate as slave valves, and in a second status of said common control connections the even valves in said chain are adapted to operate as slave valves and the odd valves adapted to operate as master valves wherein an energization status of any one valve may be stepped along the chain by alternate change of the control status of the common control connection.

The foregoing and other objects, features and advantages of the invention will be apparent from the following more particular description of preferred embodiments of the invention, as illustrated in the accompanying drawings.

Figure 4A:
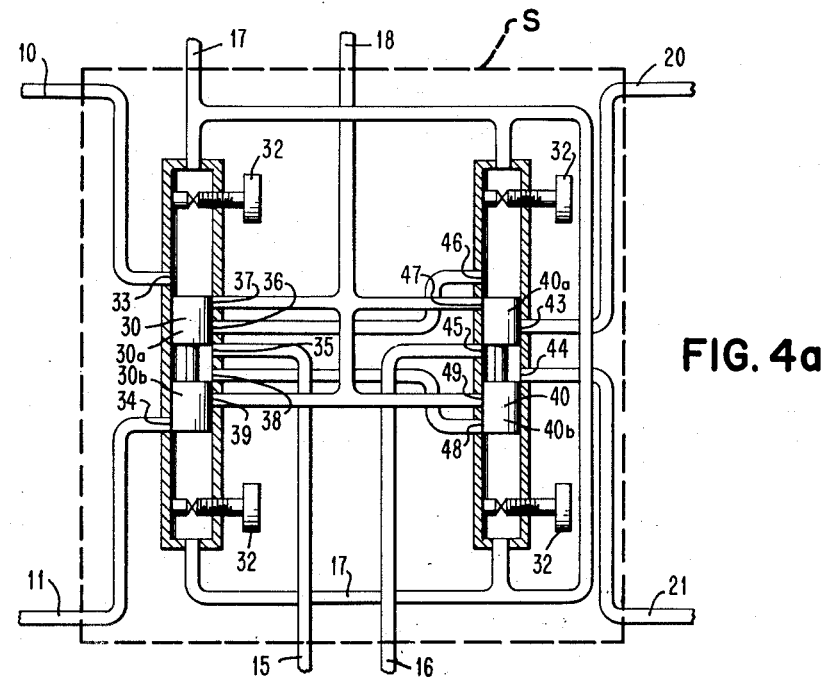
Figure 5:
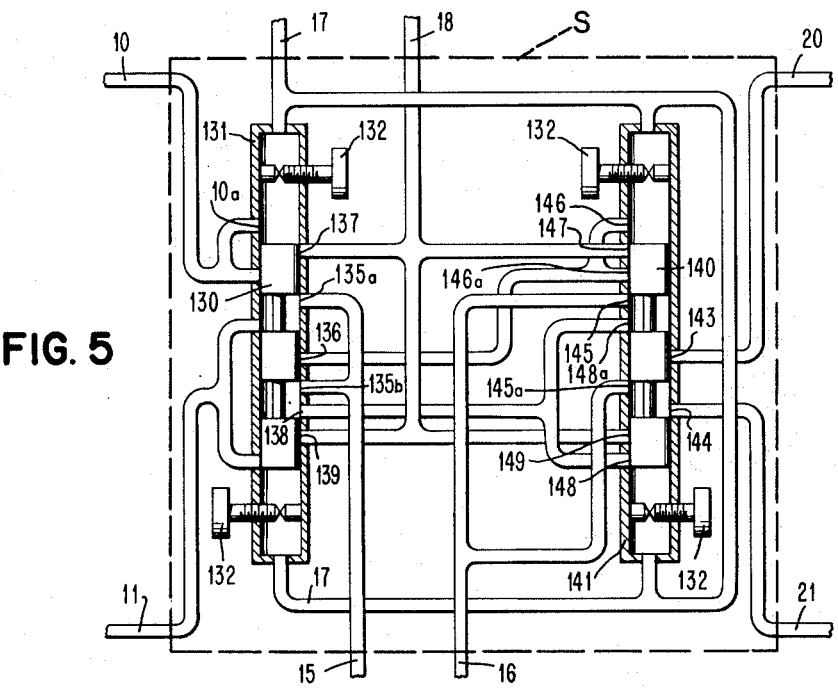
Figure 6:
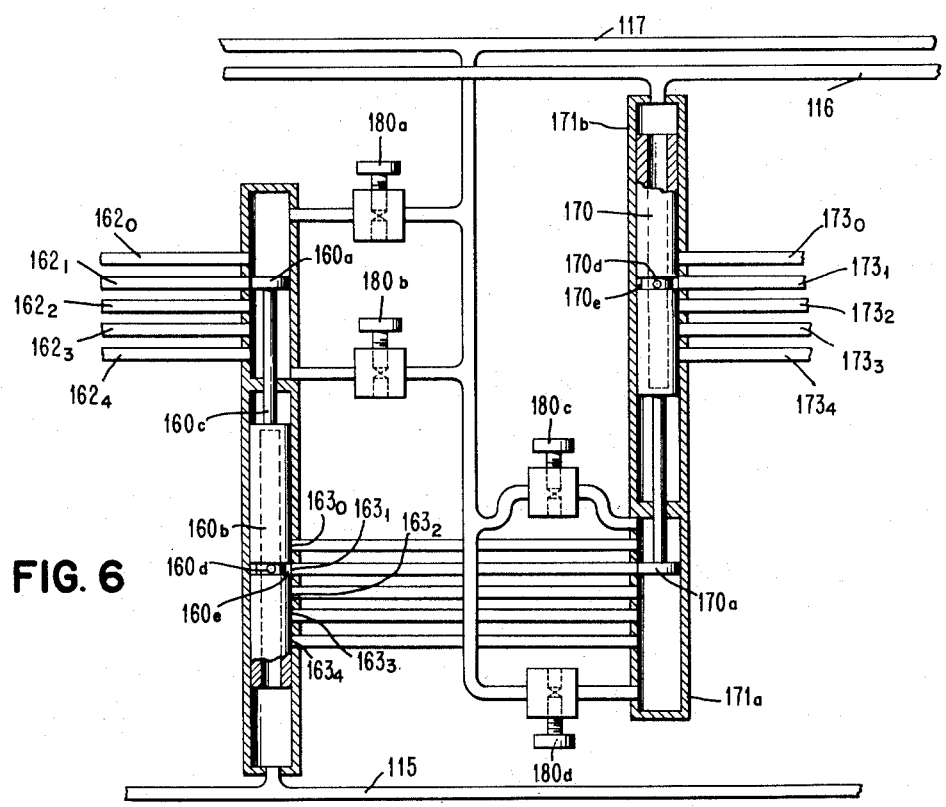
Figure 7:
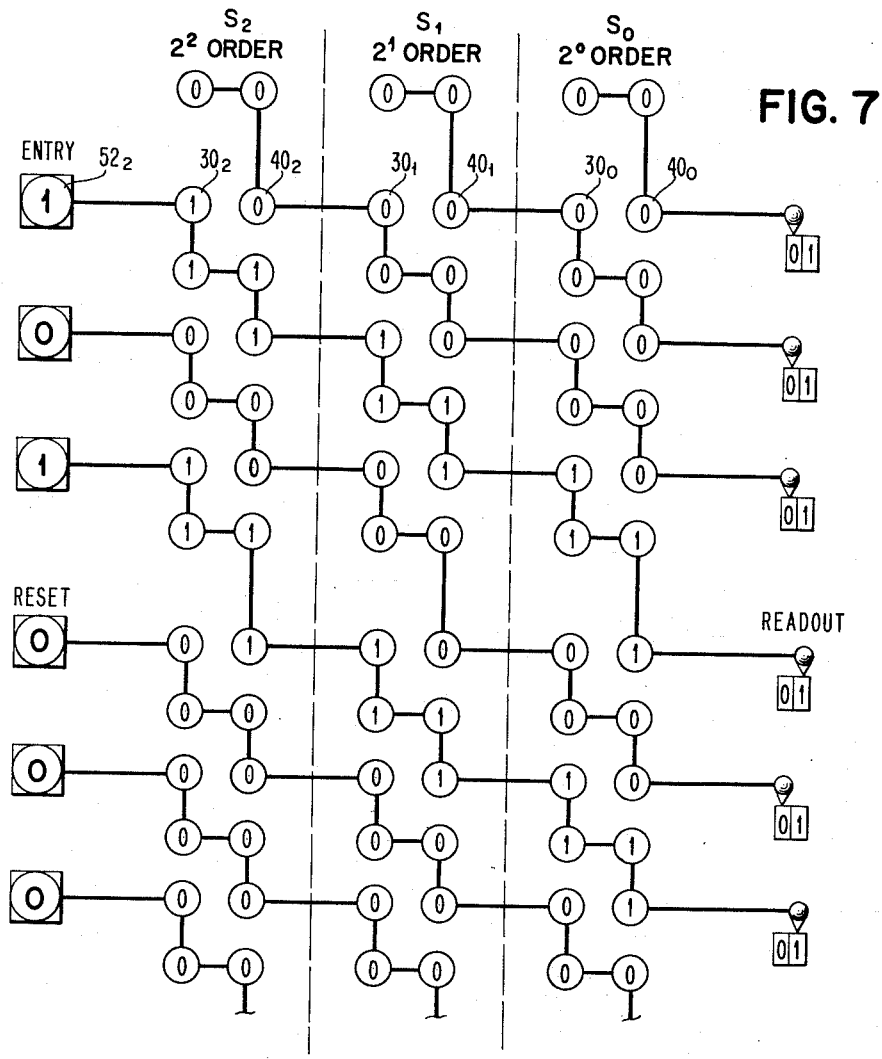
Figure 8:
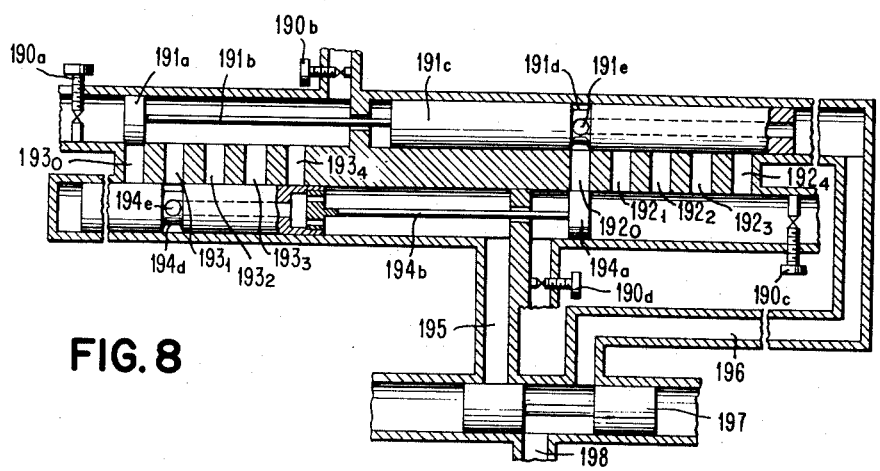

In the drawings:
FIG. 1 is a three order shift register.
FIG. 2 is a detail of the information entry valve of FIG. 1.
FIG. 3 is a detail of the valve in FIG. 1 for shifting from serial to parallel operation.
FIG. 4 is a detail of the paired valves in each order of the shift register comprising an order thereof.
FIG. 4a shows an alternate position of the valves in FIG. 4.
FIG. 5 is an alternative paired valve arrangement for an order of the shift register of FIG. 1.
FIG. 6 is a quinary radix system of paired valves.
FIG. 7 is a flow chart showing data flow through the shift register of FIG. 1.
FIG. 8 shows a combination of valves connected as a counter.

In FIGS. 4 and 4a one embodiment of the basic combination of paired valves is shown wherein the second of the two valves may be a master valve and the first valve a slave valve in a first control status, and in a second control status the first valve functions as a master valve and the second valve functions as a slave valve. With such an arrangement the paired valves are adapted for utilization in various logical devices such as counters, multi-vibrators, and shift registers for example. A typical application, that of a shift register, is shown in FIG. 1 as will hereinafter be described.

Specifically with reference to FIG. 4, the piping and valve structure enclosed within the box and labelled "S" is incorporated bodily into a similarly labelled box in FIG. 1. External piping connections to the box S include the input pipes 10 and 11, output pipes 20 and 21, pressure pipe 17, return or sump 18, and the control pipes 15 and 16. If a series of paired valve stages S are cascaded in a chain, the input pipes 10 and 11, and the output pipes 20 and 21 would be individual to each stage, whereas the pipes 15, 16, 17, and 18 would be common to all stages in the chain. Considering now the operation of the valves as shown in FIG. 4, let it be assumed that the line 17 be constantly connected to an external source of fluid pressure, and the line 18 be a return or sump line. Further let it be assumed that the line 16 be connected through external valving to sump or atmospheric pressure, and that the line 15 be closed also through external valving. In this condition of the lines 15 and 16, hereafter identified as the first control status, or A cycle, the left-hand valve of the stage is conditioned to operate as a slave valve, and the right-hand valve of the pair is conditioned to operate as a master valve. Thus the left-hand valve, by virtue of being conditioned to operate as a slave valve, is receptive to being positioned in either an upward or downward position depending on the pressure status of the input lines 10 and 11, one or the other of these being connected to sump but not both, while the remaining one is closed. For the purpose of the following explanation, the convention will be adopted that closure of the lines 10 or 20 will be manifestive of a binary "0" input or output respectively, and closure of the lines 11 or 21 will be respectively manifestive of a binary "1" input or output. Thus for an understanding of FIG. 4 it is noted that line 17 is permanently connected to pressure, line 18 permanently connected to sump, and lines 15 and 16 are in the first control status namely 16 connected to sump and 15 closed. If now a binary "1" is desired to be entered into the stage by closure of the input line 11 and connecting the input line 10 to sump, then the spool valve 30 will be moved upwardly to manifest the input. The movement or maintenance of the spool 30 in the upward direction is effected by a port sensing type of operation wherein the spool 30, considered as a whole, will center itself between two ports connected to sump so that the pressures on both sides of the valve spool will be balanced. Specifically flow from the pressure duct 17 is introduced into both ends of the valve chamber 31 through upper and lower adjustable throttle valves 32 so that any unbalanced flow on the downstream sides of the throttle valves will result in an unbalanced pressure. With the pipe connections assumed, flow from the lower valve chamber into the input pipe 11 will be blocked by virtue of that pipe being closed. Therefore if the spool 30 occupies any position below that shown full supply pressure will occur in the lower chamber. With line 10 connected to sump, pressure from line 17 will be dropped across the upper throttling valve 32 for any flow through and out of the input line 10. Thus for any position of the valve spool 30, other than the one shown there will be a greater pressure at the bottom of the valve spool 30 to force it upward to the position shown, where its further travel will be arrested by a balanced spill across the ends lands of the spool 30 into the valve ports connected to line 10 (now at sump) and the permanent sump 18.

With respect to the operation of the right-hand valve of stage S under the pressure conditions assumed above, the valve spool 40 will operate independently of the position of the valve spool 30 and will influence the pressure status of the output ducts 20 and 21, as the valve 40 is now conditioned to operate as a master valve. Adopting the same conventions as heretofore, the valve 40, being in a down position manifestive of a binary "0," will accordingly close the pipe 20 and expose the pipe 21 to sump. This condition is apparent from an examination of the respective pipes, wherein it will be noted that the outlet pipe 20 is closed by virtue of the upper spool 40a sealing off the port 43 in the valve chamber 41, and the outlet pipe 21 being exposed to sump via control duct 16, now open ports 44 and 45, and the reduced central section of valve spool 40. The valve spool 40 has been shown in the down position manifestive of a binary "0," but it equally well could have been shown in the up or binary "1" condition wherein the outlet pipe 21 would be closed by the sealing off of port 44 by the bottom spool 40b, and the outlet pipe 20 would be connected to sump by the interconnection of ports 43 and 45 through the reduced center section of spool valve 40. Thus it will be seen that when the valve 40 operates as a master valve, its sole function is to connect sump to either of the outlet pipes 20 or 21 and to close off the other pipe. Whether the valve 40 is up or down is a function of the operation of the valve in a preceding cycle where the valve 40 was slaved to follow the valve 30. Apparently for the condition assumed in FIG. 4 the valve 40 had been moved to the downward position and now maintains this position while the valve 30 receives a new entry in the form of a binary "1." Further analysis of the pressure conditions surrounding the valve spool 40 reveals that there are balanced pressures on both the upper and lower surface of the spool 40 so that, lacking any pressure unbalance, the spool will tend to maintain the position attained in the previous cycle. Specifically with the control duct 15 closed, the port 46 will be effectively closed to fluid flow so that pressure in the upper valve chamber will rise to source pressure in pipe 17, the flow to sump 18 being closed by sealing of the port 47 by the upper valve spool 40a. Balanced at the lower face of valve spool 40 is source pressure of pipe 17, flow through port 48 being sealed by the lower spool 40b and additionally by closure of port 38 in the preceding valve either by blocking of spool 30b in the condition assumed or by the closure of pipe 15 were the valve 30 in the binary "0" condition.

In the foregoing explanation it was shown that the valve 30 operates in response to the respective pressure condition of the input lines 10 and 11, and that the pressure status of the output lines 20 and 21 is a function of the position of valve 40, the valve 40 being independent of the position of the valve 30. Thus the valve 40 can compel a valve 30 in a next succeeding stage to manifest the same data by a simple interconnection of pipes 20 and 21 of this stage respectively to the pipes 10 and 11 of a next succeeding stage. Inferentially it follows that the pressure status assumed for the input lines 10 and 11 in FIG. 4 would be controlled from a valve 40 of a preceding stage or from an input device.

In FIG. 4a the second control status or B cycle of operation is shown wherein the left-hand valve operates as a master valve and the right-hand valve operates as a slave valve. Thus, any binary data entered into the left-hand valve during the preceding A cycle will be transferred during this cycle to the right-hand valve. In the second control status, or B cycle, the pressure status of control lines 15 and 16 is reversed by external valving, whereby the line 15 is now connected to sump and the line 16 closed. The lines 10 and 11 if they be connected to a preceding stage will both be automatically closed by the operation of the preceding stage as will be apparent from the explanation to follow. If the lines 10 or 11 are connected to an input device it will be necessary to maintain these lines in the same pressure status as they had during the preceding entry cycle thereinto. Thus with the valve 30 in FIG. 4a standing in the down position manifestive of a binary "0" it is assumed that during the preceding entry cycle such was entered by closing pipe 10 and connecting pipe 11 to sump. Such connections will therefore be maintained during this cycle if such entry was effected by an external entry device. If no such external entry was effected both pipes will be effectively closed.

Considering now the slave operation of valve 40, pressure and flow introduced from duct 17 over the upper and lower adjustable throttle valves 42 will again operate upon the valve 40 in a port sensing type of operation to position it as shown, whereby spill over the ends of the valve lands is balanced into the ports 47 and 48, port 47 being directly connected to sump 18 and port 48 being opened via ports 38 and 35 and the central reduced portion of valve 30 to the control pipe 15 now at atmospheric or sump pressure. Any departure of the valve spool 40 from the position shown will result in an unbalanced flow across the lands to produce an unbalanced pressure on the upper and lower valve faces by virtue of the greater pressure drop across a restriction for an increase in flow and the valve will be restored. Similarly when the pressure status of the control pipes 15 and 16 is switched from an A to a B cycle the valve 40 will have a position determined from its previous operation which may or may not agree with that of the valve to which it is now subservient. Thus, if valve 40 were up, port 48 would be fully open to sump and full flow across lower restrictor valve 32 will result in a lowered pressure at the bottom of the valve, while at the top of the valve port 46 will be sealed to flow by closure of port 36 of the master valve to produce full pressure on the top of the valve 40 causing it to move downward until the port 48 is closed and the port 47 is just closed to balance the leakages and the pressures. For a condition wherein valve 30 manifests a binary "1" the port 48 will be sealed and the port 46 opened to sump so that the valve 40 will move to just seal the ports 46 and 49 to again to balance the spill and accordingly follow the position of the preceding valve.

With the right valve conditioned as a slave valve and pipe 16 closed, outlets 20 and 21 will both be closed. For the position shown of the valve, pipe 20 is closed directly by the blocking of port 43 by the valve spool 40a. Pipe 21 is effectively closed by being connected to control pipe 16, which is closed, the connection being effected via exposed ports 44 and 45 and the reduced central portion of valve spool 40. Were valve 40 in a binary "1" position pipe 21 would be blocked by valve spool 40b and pipe 20 would be connected to blocked pipe 16 through the central portion of the valve, so that again both pipes will be effectively blocked to flow.

As was true with valve 40 during the A cycle, the valve 30 during the B cycle will maintain whatever position it achieved during the preceding cycle of operation, in that there are no unbalanced pressures to cause a perturbation of the valve. If the valve 30 in the position shown is connected to an entry device whereby line 10 is closed and line 11 connected to sump a balanced flow through both ends of the valve will take place over the end lands of the valve into the ports 34 and 37 and to sump. If the valve 30 is in a chain and the inlet pipes both closed by action of a preceding valve 40 as explained above, then full source pressure will be developed on both ends of the valve 30 which moves slightly upward to seal the port 37 against leakage. Thus with no unbalance in pressure the valve 30 will maintain its set position.

The foregoing structure forms the basis of an information or data storage or transfer device, in that it is capable of receiving data simultaneously with discharging previously entered data in one cycle of operation, and in a second cycle of operation is capable of internally transferring data entered in the preceding cycle for discharge in a subsequent cycle. As has been explained each valve is capable of controlling the next succeeding valve and of being controlled by the immediately preceding valve, the paired valves shown comprising a stage or order which may be directly coupled to a corresponding stage of a next succeeding order. Thus outlet pipes 20 and 21 would be directly connected respectively to inlet pipes 10 and 11 of the next succeeding stage.

In order, however, to achieve a more versatile and flexible type of operation a chain of paired valves S together with their appropriate input, output, control, pressure, and sump lines would preferably be connected as shown in FIG. 1 wherein there is shown a binary shifting register in which binary information may be entered either serially or in parallel, and read out either serially or in parallel for either mode of entry. Wherein parallel entry and readout is effected, readout may be effected either with or without shift.

Specifically and with reference to the drawings each stage S includes the valves and ducts, hereinabove described with respect to FIG. 4, or the valves and ducts hereinafter to be described with respect to FIG. 5. The common respective pressure and sump ducts 17 and 18 referenced in FIG. 4 are here shown as connected to the pressure and return lines of a pump P, and the common control lines 15 and 16 as shown in FIG. 4 are shown connected to a shift valve 50 which serves to alter the pressure status of the common control ducts 15 and 16 to the first and second control states or "A" and "B" cycles to which previous allusion has been made. The input connections 10 and 11, and the output connections 20 and 21 for each stage S have appended thereto subscripts indicative of the order of the particular stage under discussion, in accordance with the powers of two in the conventional binary series. For example $10_0$ and $11_0$ are the input connections for $S_0$ of the binary "$2^0$" stage. These input and output connections instead of being respectively directly coupled, as they may well be for a simple binary shifting register, are coupled instead through inter-stage valves $51_0$ and $51_1$ which valves effect a selection of operation of the register of either serial or parallel entry of data or readout thereof. The respective valves $51_0$ and $51_1$ provide selective entry connections respectively to the stages $S_0$ and $S_1$ from either the preceding respective stages $S_1$ and $S_2$ or from the respective stage entry valves $52_0$ and $52_1$, the entry valve $52_2$ being permanently connected to entry pipe $10_2$ and $11_2$ of the stage $S_2$ without option as serial entry is always effected from the high order down.

A typical data flow for a serial read in and serial read out of data in the apparatus in FIG. 1 is shown in FIG. 7. Herein the positional state of the paired valves in each stage S is represented by a "0" or "1" in the paired circles which are arranged in a matrix wherein any vertical row represents the successive states of the same valve throughout a succession of entry and transfer cycles. Each horizontal row of circles represents the state of all the valves in the corresponding entry or transfer cycle. The solid lines connecting the small circles shown the data shift from valve to valve during the alternate entry and shift cycles. The squares on the left vertical row represent key entries as for instance from the valve $52_2$ in FIG. 1 which is successively operated for each data entry. The right-hand vertical rows shows the output manifestation.

Considering the first horizontal row, it will be seen that the register is initially reset to "0" so that all of the valves 30 and 40 in each of the stages is in the down position to manifest a binary "0" as has previously been explained. During the first entry or A cycle each of the valves 30 in each stage S operates as a slave valve to the valve 40 of the preceding stage, while each valve 40 maintains its previously set position as has been heretofore explained. Thus in the first entry cycle all of the valves 40 remain in the "0" state and slave the respective valves 30 in the next succeeding stage to a similar state. The depression of the "1" entry key effects an entry into the valve 30 of stage $S_2$. During the following or B cycle the respective valves assume the state shown in the second horizontal row. Here it will be seen that there is an intra-stage data transfer as each valve 40 is slaved to the valve 30 in the same stage. Thus the "1" entered in valve 30 of stage $S_2$ will now be transferred to valve 40 of stage $S_2$, the valve $30_2$ retaining its previous setting. The remaining valves in the register do not alter their "0" status as they are either slaved to a valve in that state or have maintained the state from the previous cycle. In the second entry cycle or third cycle as shown by the third horizontal row, a "0" is entered into valve $30_2$ of stage $S_2$ while the "1" previously set in valve $40_2$ is transferred to valve $30_1$ of the next succeeding stage $S_1$, the remaining valves $40_1$, $30_0$ and $40_0$ retaining the "0" state. Thus through a succession of alternate entry and intra-stage shift operations the data entered as the binary 101 appears at the end of the sixth cycle in the valves $30_2$, $40_2$; $30_1$, $40_1$; and $30_0$ and $40_0$ respectively.

During the next succeeding cycles, zeros are entered to reset the register in alternating A and B cycles, and the 101 binary is read out in that succession. For the first reset cycle (A cycle) a "0" is entered and a "1" is read out as is shown by the seventh horizontal line in FIG. 7. For each subsequent entry cycle the valve $40_0$ effects a readout as is shown in the right vertical column. Thus at the end of the twelfth cycle the register is reset to zero in all orders and a serial readout of 101 has been completed. The stair-step data flow is clearly shown so that any entry can be traced through the successive valves in the successive stages to readout. It is of course obvious that it is unnecessary to effect a reset before a subsequent binary number is entered. For example, once the three bit binary 101 is completely entered at the end of the sixth cycle, any other three bit binary number could be entered in lieu of 000 without affecting the readout.

Returning now to FIG. 1 and viewing it in its relationship to the exemplary data flow of FIG. 7 it will be readily apparent that only the entry key $52_2$ has been employed for serial entry, and the interstage valves 51 are in the position shown in the detail thereof in FIG. 3 wherein it will be seen that the output 20 of any stage is directly coupled to the input 10 of the next succeeding stage, and 21 is directly coupled to 11 of the next stage.

The data entry valve $52_2$ shown in detail in FIG. 2 functions to close either of the entry pipes 80 or 81 which for this order are directly connected to entry pipes 10 and 11 respectively, and to connect the other thereof to sump. With such a capability, the valve $52_2$ can enter into stage $S_2$ either a "0" or "1." With the left button depressed as shown in FIG. 2 the valve is conditioned to connect the entry pipe 10 (80) to sump line 18 and to close off the line 11 (81). In accordance with the convention established with respect to the explanation of FIG. 4 closure of line 11 and connection of line 10 to sump effects a movement of valve 30 upward to effect an entry of a binary "1."

The common control or shift valve 50 operates to control the pressure status of the lines 15 and 16 to effect a first or second control status or A and B cycle therein. For data entry purposes the valve 30 is conditioned as a slave valve during the A cycle wherein the pipe 15 is closed and the pipe 16 connected to sump. Thus with the position of the valve 50, as shown, it will be readily apparent that the line 15 is blocked and the line 16 is connected to sump 18. For a depression of valve key 50a, the upper spool will block and close line 16 and the lower spool will operate to unblock line 15 and expose it to sump for intra-stage data transfer. Thus to effect data entry of 101 the appropriate keys of valve $52_2$ are depressed first to a "1," then the key 50a momentarily depressed, followed by a "0" depression of valve $52_2$, followed by a momentary depression of key 50a, and finally a "1" entry followed by a shift with a depression of key 50a. Thus the key 50a serves analogously to the motor bar on a ten key desk type adding machine.

For readout and reset in the example chosen the entry valve $52_2$ remains at "0" and the shift valve is depressed three more times to enter second shift three "0's" and read out the entered 101.

With regard to the output manifestation of a "0" or "1" shown in the right vertical column of FIG. 7, it will be apparent that such merely indicates the pressure status of the output lines $20_0$ and $21_0$ of the final stage $S_0$. In accordance with the convention established a "0" output means that the line $20_0$ is closed and the line $21_0$ is open to sump, or with reference back to FIG. 4 the valve 40 is down so as to effect this connection. To provide a physically significant manifestation of this pressure relationship, there is provided in FIG. 1 a bi-directional indicator 60 for each stage, the indicator $60_2$ being sectioned to show the details thereof. With pump pressure supplied to both sides of the piston in the indicator 60 from pressure line 17 the closure of line $20_0$ and opening of line $21_0$ to manifest a binary "0" will supply pump pressure on the right side of the piston and sump pressure to the left side thereof to cause the indicator to move to the left to thus indicate the "0" output. For a reversal of the pressure conditions the indicator 60 will accordingly move to the right to indicate a "1." Thus it will be seen that the indicators 60 provide not only a visual manifestation of data output, but also a positional displacement that may be utilized for control purposes.

If at the end of the sixth cycle (6th horizontal row of FIG. 7) the valves $51_1$ and $51_0$ are shifted to effect a parallel readout, then all of the indicators $60_2$, $60_1$, and $60_0$ will provide a manifestation of the entered 101 from the respective stages upon a depression of the valve 50a which will condition each stage with the valve 40 as a master. An examination of FIG. 3 will reveal that when the key and the valve stem occupy the down position the exit pipe 20 will be disconnected from the pipe 10 of the succeeding stage and will be connected instead to the respective entry pipe 70 of the indicator 60. So also will the exit pipe 21 be connected to the respective pipe 71 of the stage indicator 60. With the shift key 50a depressed for a B cycle and each valve 40 of each stage S conditioned as a master valve, the 101 previously entered during the preceding six cycles will be manifested in the indicators 60, as each one will respond to the respective pressure conditions in the exit pipes 20 and 21 as explained above with reference to the indicator $60_0$ for a serial readout.

With the inter-stage valves 51 in the down position necessary for a parallel readout, they will also condition the respective stages for a parallel readin from the respective entry valves 52. As will be apparent from an examination of FIG. 3, the valve 51 in its down position transfers the stage entry pipes 10 and 11 from the previous stage exit pipes 20 and 21 respectively and connects them to the respective pipes 80 and 81 of the valves 52. Inasmuch as the valve 52 has the same capability as any valve 40 of a stage, namely selectively connecting any one of the output pipes to sump and closing off the other, it can produce an entry into a stage S in the same fashion as would a valve 40 in a serial type of operation. Thus to effect the parallel entry of 101 into the respective stage $S_2$, $S_1$, and $S_0$ the valve $52_2$ would be depressed for a "1" (left key depressed as shown in FIG. 2), valve $52_1$ for a "0" (right key depressed) and the valve $52_0$ depressed for a "1." With the shift valve 50 in the position shown each of the valves 30 in the respective stages S will be conditioned as a slave valve so as to be receptive to the entry of 101 directly from the stage entry valves. Upon the depression of shift valve 50, the respective setting of the valves 30 will be maintained as previously explained, and the corresponding valves 40 in the same stage will be slaved so that valves $40_2$, $40_1$ and $40_0$ will now also manifest the entered 101. Upon release of shift valve 50 and maintenance of the interstage valves 51 in their parallel control position the valves 40 in each stage will become master valves to control the parallel readout into the respective indicators 60.

Should a serial readout be desired following a parallel entry, the inter-stage valves $51_1$ and $51_0$ need only to be returned to their serial position (as shown in FIG. 3) and the intra-stage coupling will then permit operation of the register starting at the fifth horizontal line of FIG. 7 so that successive depressions of shift key 50a, as previously explained with respect to serial entry and serial readout, will effect a serial readout of the parallel entered 101, which readout will as before be manifested only in the indicator 60.

It will readily be appreciated that various combinations of the different modes of entry and readout can be effected. Serial entry and exit, serial entry and parallel exit, parallel entry and parallel exit, parallel entry and serial exit have already been treated. It is further possible for any of various special applications to effect further sub-combinations of these basic modes by introducing a succession of shift operations intermediate the entry and exit, so as to effect a column-shift type of operation. Although in a three order register the significance of a column-shift type of operation is not fully realized, an expansion of the system beyond the three stages illustrated is an obvious one. In such operation datum intended for any given stage can be directed to that stage or to any preceding or succeeding stage and read out therefrom. For example, the "1" entered in the first entry cycle is destined for stage $S_0$, as the following "0" and "1" entries are destined for stages $S_1$ and $S_2$ respectively. By suitable selection of the sequencing of the valves the 101 entered can be shifted to the right one or more positions, assuming an expansion of the register beyond three positions shown. Thus for a two order shift a "1" entered in the $2^2$ order would be read out of $S_0$ and "0" entered in the $2^1$ order would be read out of a first added stage to the right of $S_0$ and the "1" in the $S_0$ stage would be read out of a second added stage to the right of $S_0$. The staircase data flow as shown in FIG. 7 makes such type of operation a mere extrapolation of the operation shown.

In the explanation heretofore made of the operation of the stage of FIGS. 4 and 4a mention was not made of the fact that the individual valves 30 and 40 when respectively conditioned as master valves will in an actual physical embodiment tend to creep because of the impossibility of balancing the inherent leakages past the end spools. To obviate such a condition there is shown in FIG. 5 a self-locking arrangement of paired valves identical in function insofar as the system of FIG. 1 is concerned. As in FIG. 4 the valves of FIG. 5 are enclosed in a box with entrance, exit, control, pressure, and sump connections thereto arranged in the same relative disposition as the connections of FIG. 4 and identified with the same reference characters so that direct substitution in FIG. 1 can be had.

In FIG. 5 each of the valves 130 and 140 slides respectively in valve chambers 131 and 141 between end chambers supplied with pressure from pressure duct 17 through the adjustable pressure reducing valves 132. As in FIG. 4 these valves 130 and 140 operate in accordance with a port sensing type of operation wherein the valve spool will be centered with respect to open ports so as to balance the spill across the end lands of the valves so that with the thus balanced flow the pressure drop across the flow restrictors 132 will be balanced to produce balanced forces on the valve spools. Additionally a third or center spool has been added to each valve, which spool operates when the valve is conditioned as a master valve to lock or hold the valve spool in its set position without creep.

The left-hand valve spool 130 is shown in its down position manifesting a binary "0" in the convention previously established. Therefore to produce this condition the inlet pipe 10 must be closed and pipe 11 connected to sump, and such condition is assumed. It is further assumed that valve 130 is conditioned as a slave valve by the closure of pipe 15 and connection of pipe 16 to sump. With the connection thus assumed, flow through the uppermost restriction 132 and over the upper end land of valve spool 130 into the port 137 and to sump line 18 produces a pressure in the upper valve chamber which is balanced by a pressure in the lower valve chamber by a balanced flow through lower restrictor 132 and out of the port 11b into entry pipe 11 which is now connected to sump. Flow out of port 10a is prevented by the closure of pipe 10 for a binary "0" input. Thus the valve spool 130 is centered over the just closed ports 137 and 11b. If upon a change to the control status assumed (from B to A cycle) the valve 130 manifests a binary "1" by being in the up position, the port 11b would be exposed to full flow resulting in a large pressure drop in the bottom chamber as opposed to full pressure in the upper chamber by virtue of port 137 being fully blocked which pressure unbalance will immediately position the spool to the position shown in FIG. 5.

Inasmuch as the valve 130 is conditioned as a slave valve by virtue of the blocking of control pipe 15 its position will have no effect upon the position of the valve 140. Although the valve 140 is shown as representing a binary "0" the same as is valve 130 it will be appreciated that with pipe 15 blocked there is no balanced flow through the valve 140 and into the valve 130, inasmuch as all of the ports of valve 140 which are connected to valve 130 are closed for any position of valve 130 or valve 140. Specifically ports 146 and 146a connecting with port 136 are either closed by the center spool of valve 130, as shown, or if valve 130 is up will be exposed to port 135b which is also closed. Similarly ports 148 and 148a connected to port 138 are effectively blocked by being connected, as shown, via port 135b to the closed pipe 15, or if the valve 130 be up, closed directly by blocking of port 138 by the lower spool of valve 130. The valve 140 having no connection to sump through the valve 130 will not be influenced thereby in the A cycle so that the two valves may occupy independent positions.

The valve 140, however, will be positively locked in either of the positions by balanced flows as follows. For the position of the valve, as shown, flow from the upper chamber over the end land of the valve spool 140 into the port 147 and sump line 18 will produce a pressure in the upper chamber by virtue of the pressure drop across restrictor 132. A corresponding pressure in the lower chamber will be produced by flow over the lower end land into port 148 through the connecting pipe to port 148a, open, the inter-spool space, through port 145 to pipe 16 now open to sump during the A cycle. Any departure from this position will open one port and restrict the opposite port so as to unbalance the flows and the pressure drops across the restrictors 132 to restore the valve. Similarly, were the valve 140 in the binary "1" position (up) port 148 would be fully open but flow thereinto prevented by a corresponding closure of port 148a as well as blocking of port 138 either directly by valve 130 or by the closure of pipe 15. Thus spill flow out of the lower chamber over the lower end land of valve 140 into the port 149 and sump line 18 will be effected so as to produce a pressure in the lower valve chamber less than supply pressure. In the upper chamber, with valve spool 140 up, spill flow over the upper end land thereof into the port 146 and into port 146a (now open) the interspace between the upper and center valve spools port 145 to line 16 now connected to sump will produce a corresponding balanced pressure. Flow into valve 130 from port 146 is blocked either directly by the center valve spool thereof or by exposure to closed line 15. Thus for either position of valve 140, it will be positively maintained in the set position by balanced flows across its end lands.

Just as the right-hand valve of FIG. 4 operates as a master valve during an A cycle so also does the valve 140 so operate. This action effects a blocking of one of the pipes 20 or 21 and exposing the other thereof to sump. For the binary "0" position of valve 140 shown in FIG. 5 the pipe 20 is blocked by closure of port 143 by the center spool of valve 140 while the pipe 21 is opened to sump via open port 144 the lower inter-spool space open port 145a and line 16. For a binary "1" the port 144 would become blocked by the lower valve spool thus closing line 21, while line 20 would be exposed to sump via opened port 143 the lower inter-spool space port 145 and line 16.

In the B cycle wherein valve 130 is a master valve and valve 140 slaved thereto by virtue of pipe 15 being connected to sump and pipe 16 closed, valve 130 will be locked by flow through the upper inter-spool space in the valve 130 while the lower inter-spool space provides a connection to sump for valve 140. Specifically with valve 130 in the position shown both pipes 10 and 11 will be closed by action of the preceding valve in the chain so that ports 10, 10a, 11a, and 11b will be effectively blocked. Thus flow from the upper chamber is over the end land of valve 130 into the port 137 and sump line 18, and from the lower chamber over the lower end land of valve 140 into port 11b, port 11a, upper inter-spool space, port 135a, and pipe 15 to sump. For a binary "1" (up) position the flow from the upper chamber is through port 10a, port 10, upper inter-spool space, port 135a, and pipe 15 to sump, and from the lower chamber through port 139 to sump 18. Thus valve 130 will be locked in either the binary "0" or "1" state when it operates as a master valve.

Service of valve 130 as a master valve is effected through the lower inter-spool space thereof which selectively connects either the port 138 (as shown) or the port 136 to sump so as to control the positioning of valve 140.

In the position shown flow to sump from the top chamber of valve 140 is direct, and from the lower chamber is channeled through valve 130. In the opposite condition of valve 130 the flow from the top of valve 140 is through the valve 130 and from the bottom thereof directly to sump. From the foregoing it will readily be appreciated that the apparatus of FIG. 5 functions identically with that of FIG. 4 insofar as the shift register of FIG. 1 is concerned and either may be used interchangeably.

In FIG. 6 another stage for a shift register is illustrated. Here a similar disposition of paired valves is employed wherein either may be a master or slave valve by interchanging the pressure status of the control pipes, the difference being that the paired valves have five positions of stability for operation in the quinary numeration system. As such, a succession of stages would be connected in a chain to again form a shifting register this time operable according to the radix 5, instead of a binary radix. In the quinary valve arrangement each of the valves has five inputs and five outputs, the inputs and outputs of the valves within the stage being directly coupled so as to effect intra-stage data transfer during a B type cycle of operation, and the remaining inputs and outputs are respectively coupled to a preceding and succeeding stage for interstage data transfer during an A cycle of operation. Like the binary embodiments the valves of FIG. 6 are conditioned to operate either as master or slave valves by the selective control of the pressure status on two control lines common to all stages, if they be so connected as to form a shift register. The valves in this embodiment also operate in accordance with the port sensing mode of operation.

Specifically, and with reference to FIG. 6 each of the valves 160 and 170 is connected to a fluid pressure duct 117 through adjustable flow restricting valves 180a to 180d, and the valve 160 is further connected to duct 115, while the valve 170 is connected to the duct 116, both of which ducts would in a shift register be common to all stages, as are the control ducts 15 and 16 in FIG. 1 or FIG. 4. In the same fashion, if the duct 115 is closed and the duct 116 connected to sump, an A cycle of operation will be initiated whereby the valve 160 will be conditioned as a slave valve to either an entry valve or to a preceding valve in the chain, while the valve 170 will operate as a master valve. For reversal of the pressure status of lines 115 and 116 (B cycle) the valves 160 and 170 will accordingly reverse their control status. Inasmuch as each of the control valves 160 and 170 is identical in construction, only the valve 160 will be described in detail, the similar parts of the valve 170 bearing similar ordered reference characters for correlation. The valve 160 includes a port sensing piston 160a connected by a connecting rod 160c to a piston valve 160b, each of the parts 160a and 160b operating in a separate fluid chamber 161a and 161b respectively, there being no fluid connection between the chambers. The length of the piston 160a is substantially equal to the length of any of five equally spaced ports $162_0$ to $162_4$ inclusive, which ports are connected to correspondingly numbered pipes which connect with similarly ordered outlet pipes in the valve 170 of the preceding stage, which valve will cause all but one of the five pipes to be closed and the remaining one to be connected to sump as will hereinafter be explained. With such connection, and it being assumed that the pipe $162_1$ is the sump-connected pipe, the piston 160a will seek the thus open port $162_1$ to the exclusion of all others and will center itself thereover so as to balance the spill and the flow through the flow restricting valves 180a and 180b, which valves cause an unbalanced pressure on opposite sides of the piston 160a for any unbalanced spill. Movement of the open port seeking piston 160a will position the piston valve 160b to uncover a comparably ordered output port $163_1$, the piston valve 160b being rifle drilled with the lower end thereof open, the rifle bore being exposed to any selected port by means of a radial hole 160d through the wall of the valve and a circumferential groove 160e. The open end of the rifle bore is in direct communication with the control line 115 (for valve 160) and 116 (for valve 170). Thus for any one of five inputs, the valve 160 will be positioned in a corresponding one of five physical positions.

When during a B cycle the pipe 115 is connected to sump and the pipe 116 closed the valve 160 positioned in registry with the ports $162_1$ and $163_1$ as explained will block all of the pipes $163_0$, $163_2$, $163_3$, and $163_4$ and will expose $163_1$ to sump so that the piston 170a will seek the thus opened port so as to assume a corresponding position.

Thus from the foregoing it will be appreciated that a shift register can be readily constructed using a chain of stages such as illustrated in FIG. 6, and with but a simple doubling of the number of ports in the valves 160 and 170 a decimal type of register could be effected. Whatever the radix chosen the valve arrangement preserves the alternating master-slave relationship with common control lines connected to all valves in the chain to reverse the master-slave relationship.

A further variation of master-slave valve relationships is shown in FIG. 8 wherein a closed ring of two valves is shown so connected as to provide a counter capable of counting to five, this counter employing the valves of FIG. 8 with but slight modification. In such a connection the master-slave relationship produces a regenerative effect, and with the port sensing piston of one of the valves displaced one port position with respect to the flow-controlling circumferential groove a walking effect is created whereby the valves are stepped for successive alternations of the master-slave valve relationship so as to count the number of reversals of the control status. In the FIG. 8 embodiment as in the other embodiments fluid under pressure is introduced into both the upper and lower valves through adjustable flow restriction valves 190a through 190d inclusive with the same effect as previously described of producing a reduced pressure in the downstream side thereof for an increase in flow. As in the valves of FIG. 6 the valves herein include a port sensing piston 191c, and a rod 191b connecting them. The piston 191c is rifle drilled and contains a circumferential groove 191d connecting with the rifle bore by a hole 191e, the groove 191d being in successive registry with ordered ports $192_0$ to $192_4$ inclusive while the piston 191a registers respectively with ports $193_0$ to $193_4$ are common to both the upper valve and output connections for the lower valve. Similarly the ports $192_0$ to $192_4$ are common to both valves and function as output ports for the upper valve and input ports for the lower valve. Thus as in the paired valves of FIG. 6 each valve herein has five inlet and outlet connections the difference here being that the inlet and outlet connections are respectively interconnected to form a closed loop. The bottom valve 194 is constructed similar to the upper valve except that the circumferential groove 194d spaced one port closer to the port sensing piston 104a, and the rifle bore opens into the piston rod end of the valve chamber via a plurality of holes in the piston end plug. The master-slave relationship is again effected by the selective closure of one control pipe 195 and exposure of the other pipe 196 to sump 198. In the drawings a simple two-spool two way valve 197 effects the alternate connection of the pipes 195 and 196 to sump 198 as well as the closure of the non-connected pipe. Thus in the position shown pipe 196 is sump-connected so that flow over the flow restrictors 190c and 190d over the end lands of the port-sensing piston 194a and into the circumferential groove 195d exposes the port $192_0$ to sump, all others being closed by the piston valve 191c. With such connection the port-sensing piston 194a seeks the thus-opened first port to position the lower valve in the position shown. For a reversal of position of valve 197 the sump 198 will be connected to pipe 195 and pipe 196 will be closed so that the upper valve is now slaved to the position of the lower valves. It will be noted that the circumferential groove 194d of the lower valve is now positioned opposite the second port $193_1$ thus exposing it to sump while all other ports $193_0$, $193_2$, $193_3$, and $193_4$ are closed. Thus the port-sensing piston 191a will seek the thus-opened second port moving the upper valve one position to the right. Upon a return of valve 197 to the position shown wherein the lower valve is slaved to the upper valve, the lower valve will move one position to the right. Thus the alternation of the position of the valve 197 will cause a walking operation of the valves 191 and 194 each advancing one step, so that at the end of five successive reversals thereof the upper valve will have travelled to the full extent of its travel and will by its position manifest a five count. Similarly by simple structural extrapolation a decimal counter could be achieved through the use of ten ports instead of the five shown.

While several embodiments have been shown employing cascaded valves operating alternately as master and slave valves it will be readily apparent that with such a basic showing other types of arrangement will flow readily therefrom by analogy to the well-known electronic computing components. Thus, for example, a closed and crossed connection of the output to the input in FIG. 4 (20 to 11 and 21 to 10) will produce a bistable multivibrator type of operation, which multi-vibrator can be made of the free-running type by coupling the valve 50 (FIG. 1) to one of the valves 30 or 40 so that the alternating master-slave relationship is effected by the stage valves themselves. Similarly by closing the shift register of FIG. 1 by coupling the output of $S_0$ to the input $S_2$ a hydraulic commutator or frequency divider will be constructed.

While the invention has been particularly shown and described with reference to preferred embodiments thereof, it will be understood by those skilled in the art that various changes in form and details may be made therein without departing from the spirit and scope of the invention.

What is claimed is:

1. A fluid apparatus comprising first and second fluid valves each having a like plurality of input and output ducts, the output ducts of said first valve being connected to the input ducts of said second valve, each valve being adapted to assume a like plurality of stable states under control of the pressure status of the fluid in said input ducts, and to control the fluid pressure status in said output ducts in accordance with the position of the respective valve; control means having a first and second control status and adapted in said first control status to render said first valve inoperative to affect the pressure status of the output ducts connected thereto, and in its second control status to render said second valve inoperative to affect the pressure status in the output ducts connected thereto; and means for controlling the pressure status of the fluid in the input ducts connected to said first valve whereby data as manifested by the pressure status in the input ducts to said first valve will be seriately manifested in said first valve, in said second valve, and in said output ducts in the form of a controlled fluid pressure status therein by successive alternations of said control means between said first and second control status.

2. In a fluid apparatus including a source of fluid pressure and a return line, the combination of a plurality of input ducts containing fluid and equal in number to a predetermined quantity; means for selectively conditioning the pressure status of the fluid in each of said ducts whereby the fluid pressure in a selected one of said ducts is uniquely different from the pressure in the non-selected ducts; first valve means having a plurality of stable positions equal in number to said predetermined quantity, the said valve being connected between said source of pressure, said return line and said input ducts, and operative responsive to the selective pressure status of said said input ducts to attain a unique one of said plurality of stable positions under the control of said uniquely pressured input duct; a second valve having a plurality of stable positions respectively corresponding to the stable positions of said first valve; ducts interconnecting said first valve and said second valve whereby said second valve is operatively coupled to said first valve to follow the position of said first valve; control means having a first and second control status, and adapted in its first control status to render said first valve operative to respond to the pressure status of said input ducts and to render said second valve inoperative responsive to the position of said first valve, and in its second control status adapted to render said first valve inoperative to respond to the pressure status of said input ducts and said second valve operative to follow the position of said first valve; and a plurality of output ducts equal in number to said predetermined quantity, the said ducts containing fluid, the pressure status of which is controlled by said second valve when said control means occupies its first control status.

3. In a fluid apparatus for performing logical operations according to the radix R, where R is any integer greater than one, including a source of fluid pressure and a return line, the combination of, R input ducts containing fluid; means for selectively conditioning the pressure status of the fluid in each of said ducts whereby the fluid pressure in a selected one of said ducts is rendered uniquely different from the pressure in the non-selected ducts; first valve means having R stable positions and interconnected between said source of pressure, said return line, and said input ducts, and operative responsive to the pressure status of said input ducts to attain a unique one of said R stable positions; a second valve having R stable positions respectively corresponding to the R stable positions of said first valve; ducts interconnecting said first valve and said second valve whereby said second valve is operatively coupled to said first valve to occupy corresponding respective ones of said R stable positions; control means having a first and second control status, and adapted in its first control status to render said first valve responsively operative and said second valve responsively inoperative, and in its second control status adapted to render said first valve inoperatively responsive and said second valve operatively responsive; and R output ducts containing fluid, the pressure status of which is controlled by said second valve when said control means occupies its second control status.

4. A fluid shifting register comprising a chain of pairs of fluid valves each having a like plurality of input and output ducts, the output ducts of the first valve of said pair being connected to the input ducts of the second valve and the output ducts of the second valve of said pair being connected to the input ducts of the first valve of a succeeding pair in said chain, each valve being adapted to assume a like plurality of stable states under control of the pressure status of the fluid in said input ducts, and to control the fluid pressure status in said output ducts in accordance with the position of the respective valves; control means having a first and second control status and adapted in said first control status to render the first valve of each said pairs inoperative to affect the pressure status of the output ducts connected thereto, and in its second control status to render the second valve of each said pairs inoperative to affect the pressure status in the output ducts connected thereto; and means for controlling the pressure status of the fluid in the input ducts connected to the first valve of the first pair of said chain whereby data as manifested by the pressure status in the input ducts to said first valve will be seriately manifested in each of the successive valves in said chain and finally in the output ducts connected to the last valve of the last pair in said chain by successive alternations of said control means between said first and second control status.

5. In a fluid apparatus, the combination of a plurality of data input ducts, with means associated therewith for selectively opening one and closing the remaining thereof to manifest an input datum; a first housing having a plurality of spaced ports therein equal in number to the number of data input ducts, each of which ports is respectively connected to a corresponding one of said input ducts; a first piston slidable within said first housing and segregating the housing into two end chambers, the piston being so configured with respect to said ports that it is operative to selectively cover one only of said ports while exposing the remaining ones thereof; a source of fluid under pressure; fluid flow restriction means connected between said source of fluid and each of said end chambers, whereby the said first piston will seek a position to close that port connected to the single open data input duct; a first valve operatively connected to said first piston and having a plurality of output ducts equal in number to the number of data input ducts, the said first valve being operative responsive to the position occupied by said first piston to selectively open one duct and close the remaining of said output ducts to manifest the respective status of corresponding ones of said data input ducts; a second plurality of input ducts, second housing, second piston, and a second valve including a plurality of output ducts, all of which are operatively associated with one another and with said source of fluid pressure as are the respective corresponding first components; means connecting each of the output ducts of said first valve with a corresponding respective one of said second input ducts; a plurality of data output ducts each of which is respectively connected to a corresponding one of the output ducts of said second valve; and means for rendering said first and second valves alternately inoperative to manifest the status of the input ducts respectively associated therewith.

6. A fluid apparatus comprising, first and second sets of data input ducts, each set having an equal number of ducts; first and second housings each having a plurality of spaced ports therein equal in number to the number of ducts in each of said sets, each of which ports is respectively connected to a corresponding one of said ducts in said first and second sets; first and second pistons slidable within the respective housings and segregating them into two end chambers, each of which pistons is so configured with respect to the associated housing and ports that it is operative to selectively cover one only of said ports while exposing the remaining ones thereof to the end chambers; a source of fluid under pressure; fluid flow restriction means connected between said source of fluid and the end chambers of said first and second housings, whereby each of said pistons will seek and cover any port connecting with a selectively opened input duct; first and second valves operatively connected respectively to said first and second pistons, each having a plurality of output ducts equal in number to the number of input ducts in each of said first and second sets, the ducts of said first valve being respectively connected to corresponding ducts in said second set, and the ducts of said second valve being respectively connected to corresponding ducts in said first set, the said first valve being operative under control of said first piston to selectively open an output duct whose positional status corresponds to the port covered by said first piston while closing the remaining ducts, and said second valve being operative under control of said second piston to selectively open an output duct whose positional status is one position removed from the position of the corresponding port covered by said second piston; and means for alternately rendering said first and second valves operative to permit fluid flow therethrough in accordance with the positional status of the valve.

7. A fluid apparatus comprising, a pair of input ducts, means for producing a relative pressure status therein manifestive of an input condition, a first valve connected to said input ducts and adapted to occupy one of two stable positions in response to the pressure status in said input ducts, a second valve connected to said first valve operative to respond to the position of said first valve to occupy a corresponding one of two stable positions, output ducts connected to and controlled by said second valve to produce a relative pressure status therein manifestive of the position of said second valve, and shifting means for alternately rendering said first and said second valves inoperative to control respectively the position of said second valve and the pressure status in said output ducts.

8. The fluid apparatus of claim 7 wherein said first and second valves each include means under the control of said shifting means for locking the position of each of said valves when each is rendered operative as a controlling valve.

9. A fluid shifting register, comprising input means for producing a pressure status manifestive of input data, a chain of pairs of fluid valves each valve adapted to occupy a plurality of stable positions and to control the position of the next succeeding valve in the chain to occupy a corresponding one of said plurality of positions, the first valve of said chain being operative responsive to said input means, output means connected to and controlled by the last valve in said chain, and means for alternately rendering the odd and even valves in said chain inoperative to control the positioning of the next succeeding valve in the chain.

References Cited in the file of this patent
UNITED STATES PATENTS

| | | |
|---|---|---|
| 2,522,481 | Martin | Sept. 12, 1950 |
| 2,689,548 | Holm et al. | Sept. 21, 1954 |
| 2,917,026 | Hall et al. | Dec. 15, 1959 |
| 2,936,117 | Yaunker | May 10, 1960 |